US012616290B2

(12) United States Patent
Mündler

(10) Patent No.: US 12,616,290 B2
(45) Date of Patent: May 5, 2026

(54) DEVICE FOR HYGIENICALLY PACKAGING, FOR TRANSPORTING, AND FOR STORING A COSMETIC PRODUCT

(71) Applicant: samplistick GmbH, Düsseldorf (DE)

(72) Inventor: Daniela Mündler, Düsseldorf (DE)

(73) Assignee: samplistick GmbH (DE)

( * ) Notice: Subject to any disclaimer, the term of this patent is extended or adjusted under 35 U.S.C. 154(b) by 0 days.

(21) Appl. No.: 18/834,334

(22) PCT Filed: Feb. 2, 2023

(86) PCT No.: PCT/EP2023/052606
§ 371 (c)(1),
(2) Date: Jul. 30, 2024

(87) PCT Pub. No.: WO2023/148293
PCT Pub. Date: Aug. 10, 2023

(65) Prior Publication Data
US 2025/0113911 A1     Apr. 10, 2025

(30) Foreign Application Priority Data

Feb. 2, 2022    (EP) .................................... 22154714

(51) Int. Cl.
*A45D 40/00*        (2006.01)
*A45D 34/04*        (2006.01)
(Continued)

(52) U.S. Cl.
CPC ......... *A45D 40/0087* (2013.01); *A45D 34/04* (2013.01); *B65B 3/04* (2013.01); *B65B 57/10* (2013.01); *G06Q 10/0875* (2013.01)

(58) Field of Classification Search
CPC ...... A45D 40/0087; A45D 34/04; B25G 1/08; G06Q 10/0875; B65B 3/04; B65B 57/10
See application file for complete search history.

(56) References Cited

U.S. PATENT DOCUMENTS 3,104,032 A * 9/1963 Hansen ................ B65D 51/222
                                                                215/DIG. 5
3,589,983 A * 6/1971 Holderith et al. ..... C12M 23/08
                                                                435/288.2
(Continued)

FOREIGN PATENT DOCUMENTS

GB          640242 A  *  7/1950  ........... B65D 47/248
GB         2103083 A      2/1983
(Continued)

*Primary Examiner* — Dariush Seif
(74) *Attorney, Agent, or Firm* — The Belles Group, P.C.

(57) ABSTRACT

The present invention relates to a device for hygienically packaging, for transporting and for storing a cosmetic product, wherein the device comprises a removal scoop and a hollow body, which can be detachably interconnected. The removal scoop comprises a head region having a U-shaped edge and an indentation for receiving the cosmetic product, and a handle. The hollow body comprises an outer wall, an inner wall, and an opening, through which the removal scoop can be inserted into the hollow body. The U-shaped edge of the head region of the removal scoop is designed such that, when the hollow body and the removal scoop are connected, the U-shaped edge of the removal scoop rests along the inner wall of the hollow body. The present invention also relates to a method for identifying and hygienically packaging a cosmetic product using this device.

20 Claims, 5 Drawing Sheets

Figures 1, 2:
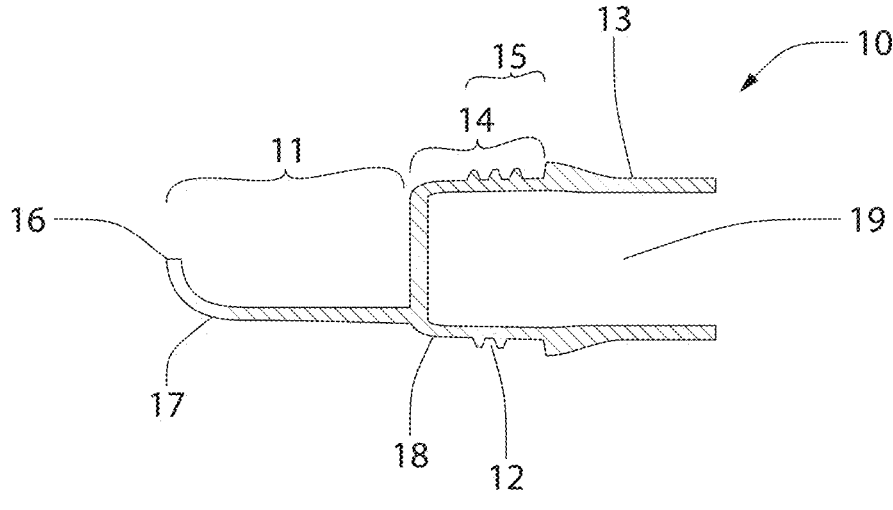

(51) Int. Cl.
    *B65B 3/04*           (2006.01)
    *B65B 57/10*         (2006.01)
    *G06Q 10/0875*    (2023.01)

(56)           References Cited

U.S. PATENT DOCUMENTS

| | | | | |
|---|---|---|---|---|
| 4,091,965 | A | * | 5/1978 | Gebhard ............... B65D 47/265 |
| | | | | 222/548 |
| 4,095,716 | A | * | 6/1978 | Meany ................. B65D 77/245 |
| | | | | 426/115 |
| 4,889,228 | A | * | 12/1989 | Gueret ............... A45D 40/0087 |
| | | | | 206/823 |
| 5,462,101 | A | * | 10/1995 | Mouchmouchian ......................... |
| | | | | B65D 77/245 |
| | | | | 141/366 |
| 5,556,008 | A | * | 9/1996 | Silver ................... A61J 7/0023 |
| | | | | 222/207 |
| 5,682,931 | A | * | 11/1997 | Mouchmouchian ...... B65B 3/06 |
| | | | | 141/366 |
| 5,941,254 | A | * | 8/1999 | Heler ..................... A45D 40/24 |
| | | | | 132/297 |
| 6,691,716 | B2 | * | 2/2004 | Neuner ................ A45D 40/267 |
| | | | | 132/218 |
| 6,709,181 | B1 | * | 3/2004 | Montoli ............. A46B 11/0006 |
| | | | | 401/122 |
| 6,957,492 | B1 | * | 10/2005 | Westfall ................ A47J 43/288 |
| | | | | 30/151 |
| 7,213,620 | B2 | * | 5/2007 | DeJonge ................ B65D 47/12 |
| | | | | 141/22 |
| 7,249,906 | B2 | * | 7/2007 | Kessler ................. A45D 40/26 |
| | | | | 215/390 |
| D590,497 | S | * | 4/2009 | Noble ......................... D24/116 |
| 8,545,120 | B2 | * | 10/2013 | Breidenbach .......... A45D 34/06 |
| | | | | 401/35 |
| 10,136,720 | B2 | * | 11/2018 | Hasegawa .............. A45D 40/24 |
| 2001/0052348 | A1 | * | 12/2001 | Fischer ............. A45D 40/0087 |
| | | | | 132/218 |

| | | | | |
|---|---|---|---|---|
| 2003/0147686 | A1 | * | 8/2003 | Duqueroie ............. A45D 33/16 |
| | | | | 401/129 |
| 2005/0006412 | A1 | * | 1/2005 | Albisetti ............. B05B 11/1059 |
| | | | | 222/321.9 |
| 2005/0217685 | A1 | * | 10/2005 | Burkholz ............... A45D 29/17 |
| | | | | 132/74.5 |
| 2005/0260026 | A1 | * | 11/2005 | Kessler ................ B65D 77/245 |
| | | | | 401/125 |
| 2006/0225759 | A1 | * | 10/2006 | Fukuda .............. A45D 40/0087 |
| | | | | 132/218 |
| 2009/0183747 | A1 | * | 7/2009 | Salicunaj ............... A45D 40/30 |
| | | | | 132/319 |
| 2009/0279937 | A1 | * | 11/2009 | Peck .................... B65D 75/585 |
| | | | | 401/128 |
| 2010/0098479 | A1 | * | 4/2010 | Brantenaar .......... A45D 34/045 |
| | | | | 401/129 |
| 2012/0178055 | A1 | * | 7/2012 | Reyzis .............. G09B 19/0023 |
| | | | | 434/100 |
| 2015/0037083 | A1 | * | 2/2015 | Mehta .................. A45D 34/045 |
| | | | | 401/129 |
| 2016/0257470 | A1 | * | 9/2016 | Casey ................ B65D 81/3266 |
| 2018/0280905 | A1 | * | 10/2018 | Orsita ................ B01F 33/8442 |
| 2019/0125059 | A1 | * | 5/2019 | Kukreja .............. A45D 34/045 |
| 2021/0235849 | A1 | * | 8/2021 | Charraud .............. G06V 20/40 |
| 2022/0183446 | A1 | * | 6/2022 | Binti Mohd Yasin ...................... |
| | | | | A45D 40/24 |
| 2022/0346527 | A1 | * | 11/2022 | Mecca ................. A45D 34/047 |
| 2023/0148734 | A1 | * | 5/2023 | Edwards ................ A45D 40/00 |
| | | | | 132/200 |
| 2025/0082088 | A1 | * | 3/2025 | Srivastava ............. A45D 33/00 |
| 2025/0113911 | A1 | * | 4/2025 | Mündler ............... A45D 40/00 |
| 2025/0261739 | A1 | * | 8/2025 | Lee ........................ A45D 34/04 |
| 2025/0261741 | A1 | * | 8/2025 | Bianco ................ A45D 40/264 |

FOREIGN PATENT DOCUMENTS

| | | | |
|---|---|---|---|
| KR | 20180003252 | U | 11/2018 |
| WO | 0191600 | A2 | 12/2001 |

* cited by examiner

STANDARD FUNCTIONALITY WITHOUT REGISTRATION
..... COMMUNITY FUNCTIONALITY AFTER REGISTRATION

| 1 | DATA ENRICHMENT |
| 2 | DATA ANALYSIS |
| 3 | BUSINESS INTELLIGENCE |
| 4 | CAMPAIGN CONTROLL |
| 5 | DATA SAVING |
| 6 | INFORMATION |
| 7 | OWN CONTENT |
| 8 | COMMUNITY CONTENT |
| 9 | OWN CONTENT |
| 10 | COMMUNITY CONTENT |
| 11 | IDENTIFIES PRODUCT SAMPLE |
| 12 | OWN CONTENT |
| 13 | COMMUNITY CONTENT |

DEVICE FOR HYGIENICALLY PACKAGING, FOR TRANSPORTING, AND FOR STORING A COSMETIC PRODUCT

CROSS-REFERENCE TO RELATED APPLICATIONS

The present application is a U.S. national stage application under 35 U.S.C. § 371 of PCT Application No. PCT/EP2023/052606 filed Feb. 2, 2023, which claims priority to European Patent Application No. 22154714.4 filed Feb. 2, 2022, the entire disclosures of which are incorporated herein by reference.

The subject matter of the present invention is a device for hygienic filling, transport and storage of a cosmetic product, as well as a method for the identification and hygienic filling of a cosmetic product.

Cosmetic retailers, particularly perfumeries and drugstores, and in the case of pharmacy cosmetics also pharmacies, provide and stock many different products. These cosmetic products are available in closed, partly sealed packaging. For some products, there are testers that are available opened and from which the customer can take a small amount to test the product on site. More in-depth testing, e.g. of decorative cosmetics for color effects in different lighting conditions or fragrance samples for the development of a fragrance over time and in interaction with the customer's individual skin condition, is often not possible in the short time of a visit and purchase in the perfumery.

Furthermore, it may not be desirable from a hygienic point of view for different customers to use the same tester to remove the product to be tested.

If a customer did not want to test a cosmetic product at the point of consultation or purchase, the point of service (POS), as in the perfumery, but in a private setting or wanted to test it over several applications, e.g. with regard to tolerance, allergies or an effect on the complexion, a longer-term application outside the POS would be desirable. In this case, the product had to be given to the customer in a small test quantity as a product sample. Pre-prepared product samples packaged in test quantities exist for this purpose.

However, only a very small number of cosmetic products offered in retail stores are available as product samples. These are mainly new releases, so that potential customers can be presented with newly launched products for individual testing. For logistical reasons in production, as well as for reasons of shelf life and space in the retail store or warehouse, it is generally the case that only a very small number of the cosmetic products in the range are available as product samples, especially for customers to take away.

Liquid preparations such as fragrance samples are often dispensed in small pump atomizers, which can be difficult to handle. As the dimensions are very small, operating the pump mechanism is a cumbersome process, especially for customers with poor fine motor skills such as senior citizens.

Product samples of semi-solid and sometimes also liquid preparation forms are also packaged in sealed sachets for single use. These can be distributed to potential customers directly or glued into flyers or print media. The sachets are torn open at a flap and the product sample is removed at the tear-off opening. Clean removal is virtually impossible and the sample comes into contact with the outside. Once a sachet has been torn open, it cannot be resealed and is therefore difficult to store.

Packaging or containers for cosmetic product samples are also known in various designs from the state of the art.

In FR 2 823 719 A1, for example, a packaging is described which is intended to contain a sample of a cosmetic product. It comprises an outer shell forming an upper panel (3), a lid (4) able to tip rearward by means of a hinge (42) and a container (5) for the cosmetic product. The upper panel comprises a central removable part (30) fixed to a peripheral part by means of a first weakened line. The central part is fixed to the lid so that opening of the lid leads to rupture of the weakened line. The central part of the upper panel has a lower surface coated with a reflecting layer (300) so that this surface forms a mirror when the lid is opened.

A pump sprayer for cosmetic samples is disclosed, for example, in FR 2 837 177 A1. The assembly (1) comprises a container (2) having a body (3) with a closed base (4) and a mobile part (20) with a seal lip (25) which responds to manual pressure on a surface (21) by reducing the volume (80) between it and the base, causing the product to be sprayed through an outlet (7). The mobile part is returned to its initial position by a spring (6), allowing air to enter the container.

Furthermore, FR 2 826 245 A1 describes a dispenser for a liquid cosmetic product sample, typically a cream. This comprises a container (2) which contains the cream and is formed by a side wall (20) and a bottom delimiting a useful volume. The useful volume is typically in the range of 2 to 10 cm³. A ring (3) engaging the internal surface of the container forms a stop (31) for a piston (4) during its axial displacement. A dispensing head (5) engages the bottom and comprises an outlet channel (50) with a means for opening or closing the channel.

Other devices from the state of the art describe containers for cosmetic products that are to be packaged in larger quantities than that of a product sample.

US 2005/006412 A1 describes a device for packaging and dispensing of a cosmetic product which includes a container to hold the product, with the container being delineated by a body. A movable element moves relative to the container body and is capable, in response to an action exerted manually on a surface of an actuating element, of moving from a first position to a second position. The movable element incorporates a first lip intended to engage with an inner wall of the body, during at least part of its movement, thereby isolating a dose of product inside the container in a manner to cause its expulsion through at least one dispensing aperture. The movable element also includes an upper lip capable of being applied in to closely engage the inner wall during at least a portion of its movement from the first position to the second position.

A container system is disclosed in US 2015/037083 A1 comprising a bottle body having an inner cavity and a threaded rim, an inner housing compatible with the inner cavity, a layer of a content sample placed between the inner cavity of the bottle body and the inner housing, a container removably placed within the inner housing and the stored content, and a lid to form a seal with the bottle body when attached to the threaded rim. A brush can also be attached to the lid to disperse the contents. The contents are protected from environmental degradation while the layer continues to display characteristics of the contents. The container has a first section and a second section. The sections have different shapes but are integrated into a single cavity. The single cavity prevents the contents from settling and makes it easier to stir the contents for actual use.

A storage container for liquids or for viscous or sprayable products is known from patent application DE 10 2009 021 501 A1, which can be connected to a dosing device, the storage container being cylindrical in shape and having a bottom with pressure balancing devices and an opposite open side. The open side comprises a connection area and an inner bag that can be collapsed by suction is arranged in the storage container. The various parts of the storage container make it complex to manufacture.

The object of the invention is to provide a device and a method for filling cosmetic products in customary sample quantities while at the same time ensuring simple and hygienic handling.

The manufacture of such a device should be economical and simple.

In addition, the described disadvantages of the known packaging for product samples of cosmetic products are to be overcome.

The present problem is solved by a device according to the invention for hygienic filling, transport and storage of a cosmetic product with the features according to claim 1, as well as by the method according to the invention for the identification and hygienic filling of a cosmetic product with the features according to claim 13.

For the purposes of the present invention, the term "product sample" describes a cosmetic product in a quantity that is significantly less than the quantity in which the product is available in commercially available packaging and is supplied to the end consumer. Depending on the characteristics of a cosmetic product, commercially available packaging differs greatly in quantity and form. These characteristics are, for example, the texture, place and mode of application or the ingredients. For a body lotion, for example, a quantity of 50 ml to 500 ml can be a standard commercial quantity, whereas a lipstick or lip gloss is usually packaged in much smaller quantities, usually 3 ml to 10 ml. The quantity of a product sample is correspondingly smaller.

For the purposes of the present invention, "commercially available packaging" is packaging in a shape and size that is commonly supplied to the user in the trade for the respective product. These can be, for example, tubes, jars, bottles, pump bottles, pens, also in screw or sliding sleeves, containers with applicators, pans, palletes or cans.

In the following, the term "container" refers to a receptacle for a cosmetic product that can be connected to a lid with an integrated applicator, for example a sponge, a brush or a spoon.

In this case, the "user" is an end consumer, an interested party who is interested in a cosmetic product or who is to be persuaded as an interested party and would like to test it first. This test should allow for one or more applications, e.g. over several days, in order to be able to determine a longer-term effect, such as a change in skin appearance, hair texture or other positive or negative effects. Furthermore, the test should be possible for the user regardless of location, in particular as a self-application at home.

For the purposes of the present invention, a "supplier" is a retailer, a manufacturer or a promoter who offers a cosmetic product and/or a product sample to the user for a fee or free of charge or who would like to give it to the user.

For the purposes of the invention described, a "tester" is a commercially available or smaller package that is not available for sale in a retail store, but can be opened in the store or is kept open to allow the user to test the product. In special cases, in particular in the case of lipstick or other make-up products, a "tester" can also be a modified packaging that visualizes the color of the product to the outside.

In particular, "hygienic filling" involves taking a product sample from standard commercial packaging and transferring it to a container without touching the texture. This prevents the introduction of germs during filling.

The "sampling spoon" is used on the one hand to remove the cosmetic product from the tester as a product sample. On the other hand, the user removes the cosmetic product from the sampling spoon for an application.

The "recess" is a concave area of the sampling spoon into which a product sample can be taken.

The back of the recess forms the convex "outside" of this area. It should not be touched for hygienic reasons.

In the present invention, the term "ergonomically" shaped refers to a shape that is adapted to the physiological conditions of the body, in particular the human hand and the human finger, and thus optimizes the process of opening and closing a device, the removal and application of a product sample by the user and thus makes it easier and more comfortable.

In the context of the present invention, the term "identifier" describes an artificially assigned feature for unique identification. This includes, for example, a barcode or QR code or any other marking corresponding to the respective technical standard. An identifier is regularly attached to a cosmetic product, often on the commercial packaging or on the outer packaging or cardboard box. Testers often do not have an identifier as they are not designed for distribution to users. However, they are always labeled with at least a batch number.

A device according to the invention for hygienic filling, transport and storage of a cosmetic product comprises a sampling spoon having a head portion with a U-shaped edge and a recess for receiving the cosmetic product and a handle, and a hollow body with an outer wall, an inner wall and an opening through which the sampling spoon can be inserted into the hollow body, wherein the hollow body and the sampling spoon can be detachably connected to one another and wherein the inner wall of the hollow body and the U-shaped edge of the head portion of the sampling spoon are designed in such a way that, when the hollow body and the sampling spoon are connected, the U-shaped edge of the sampling spoon lies against the inner wall of the hollow body.

This device is used to remove a test quantity, preferably the size of a product sample, from a cosmetic product that is available in a commercially available package or tester. As the sampling spoon has a head portion and a handle, it can be gripped by the handle and the cosmetic product can be conveyed contactless into the recess of the sampling spoon using the head portion.

This makes it possible to hygienically fill a cosmetic product without touching the texture. Contactless handling prevents germs from entering both the original product and the filled product sample.

Filling is carried out using the U-shaped edge at the head portion. The edge is basically at a right angle. It is sharp enough so that it can also be used to remove or fill firmer textures, such as pencils and compressed powders. These are preferably lipsticks, lip gloss, concealers, eyeliner and contour pencils, as well as eye shadow, face powder or blusher.

Preferably, the U-shaped edge is also soft enough or deburred to such an extent that the cosmetic product located in the recess of the sampling spoon can be handled comfortably without risk of injury. It should be noted that the cosmetic product is removed from the recess, for example with the user's finger, in order to apply it.

The handle of the sampling spoon has a wide gripping surface that allows easy and hygienic handling. The handle can be cylindrical, hyperboloid and/or tapered. It can also be designed in the form of a (straight) prism. A hyperboloid shape with a slight curvature is preferred. The lateral surface represents the gripping surface. The radius of the curvature is preferably such that the gripping surface can be gripped comfortably with the human finger end phalanges. Furthermore, the gripping surface can be partly hyperboloid or conical and partly cylindrical. These designs have the advantage that the handle allows simple and easy operation.

The device also has a hollow body with an outer wall, an inner wall and an opening. The sampling spoon can be inserted into the hollow body through the opening. Depending on the shape of the handle, the opening has the shape of a circle or a polygon. In the case of a polygon, the corners lie on the circumference of a circle.

When connected, the U-shaped edge of the sampling spoon lies along the inner wall of the hollow body. This is achieved by the fact that the U-shaped edge and the inner wall of the hollow body are shaped accordingly. Both have matching shapes. The design of the U-shaped edge and the inner wall prevent the filled cosmetic product from moving from the recess of the sampling spoon to the outside or the lower area of the inner wall after filling during transport and storage. Thus, the filled cosmetic product can be transported and stored cleanly.

After hygienic filling, creamy and firmer textures generally remain in the recess of the head portion of the sampling spoon during transport and storage. Low-viscosity or liquid textures can also be transported almost completely into the recess of the sampling spoon by orientating the device accordingly before the hollow body and sampling spoon are detached.

Advantageously, the cosmetic product can be removed almost completely from the recess of the head portion of the sampling spoon even after transport and storage thanks to the design of the device according to the invention, in which the U-shaped edge lies against the inner wall of the hollow body when the hollow body and sampling spoon are connected.

This device according to the invention has the particular advantage that, for the first time, it is possible to hygienically fill every possible cosmetic product with a single device, regardless of its texture and the shape of the commercially available packaging or tester. It is no longer necessary to produce different product samples in individual packages and keep them in stock.

In a particularly advantageous embodiment, the inner wall of the hollow body and the recess of the head portion of the sampling spoon are designed in such a way that, when connected, the outside of the head portion of the sampling spoon rests against the inner wall of the hollow body. In particular, this prevents parts of the cosmetic product from migrating from the recess of the sampling spoon into other areas of the hollow body. In this embodiment, the hollow body encloses the head portion of the sampling spoon. This can be achieved, for example, by adapting the curvature of the inside of the hollow body to the curvature of the outside of the head portion of the sampling spoon.

Advantageously, the curvature of the inner wall of the hollow body allows any residue of the cosmetic product adhering to it to be removed with a finger.

In a particularly preferred embodiment of the device according to the invention, the sampling spoon has a base portion arranged between the head portion and the handle, which has a connecting portion facing the handle and a sealing portion facing the head portion. The hollow body has a further connecting portion arranged on the inner wall in the area of the opening. These connecting portions are designed in such a way that the detachable connection is made by connecting these connecting portions to each other and the sealing portion of the sampling spoon is pressed against the inner wall of the hollow body in a sealing manner in the connected state. In particular, the sealing portion lies in an annular shape against the inner wall of the hollow body.

The connecting portions can, for example, be designed as a detachable snap connection, whereby one of the connecting portions has a bead and the other of the connecting portions has a recess or an undercut. When the two connecting portions are connected, the bead of one connecting portion snaps into the recess or undercut of the other connecting portion. A bayonet connection or a screw connection is also possible.

Advantageously, the connecting portion of the sampling spoon has an external thread and the connecting portion of the hollow body has an internal thread. The internal thread and the external thread can be designed as a trapezoidal thread with a flank angle of at least 28° and at most 32°. A flank angle of 25° to 35° can also be provided. A flank angle of 30° is particularly preferred. It is particularly advantageous that the internal thread and the external thread engage tightly in the connected state.

In a particularly preferred embodiment, the outer wall of the hollow body is designed hyperboloid, cylindrical and/or tapered. The outer wall can be designed in such a way that hyperboloid, cylindrical and tapered areas alternate. In particular, the outer wall can have a hyperboloid central area and two cylindrical edge areas. The cylindrical edge areas can be very small, resulting in a visually appealing hollow body. A hyperboloid shape with only a slight curvature of the outer wall is preferred. The curvature has a radius that makes it comfortable to touch and handle with the hand. An outer wall in the shape of a prism would also be possible. In this case, it is particularly advantageous that the hollow body cannot roll away on a flat surface.

The inner wall of the hollow body can also have a hyperboloid, cylindrical and/or tapered shape. Preferably, it has a conical and/or hyperboloid area that widens towards the side of the opening. This makes it easier to insert the sampling spoon into the hollow body. Even with a prism-shaped outer wall, a hyperboloid, cylindrical and/or tapered shape of the inner wall is advantageous. The wall thickness then varies.

It is preferred if the device in the connected state and also the hollow body and the sampling spoon each have an aesthetic design as individual parts. Above all, this includes a shape, design and dimensions that leave a beautiful and harmonious visual and tactile impression on human perception.

Preferably, the device, the hollow body and the sampling spoon are of such a shape, design and dimension that they can be handled as a hand flatterer. In particular, the dimensions of the device, the hollow body and the sampling spoon can fit comfortably in an average-sized human hand and, due to the nature of their surfaces, shapes and edges, can produce a pleasant sensation when touched, especially by the user.

The recess of the sampling spoon preferably has a filling volume of 1 ml to 15 ml. In one embodiment, the recess has a filling volume of 1 ml to 4 ml, in another from 10 ml to 15 ml or from 9 ml to 12 ml. A filling volume of 1 ml to 7 ml would also be conceivable, and a filling volume of 3 ml to 4 ml or 3 ml to 5 ml is particularly preferred. Larger filling volumes are particularly suitable for hair and body care products or bath additives. Smaller filling volumes are suitable for facial care, decorative cosmetics, eye care or the like.

The recess of the sampling spoon preferably has a depth of 3-10 mm, particularly preferred 4-6 mm. It also has a width of 12-17 mm, preferably 13-15 mm. The length of the recess of the sampling spoon is advantageously 25-40 mm, particularly preferred 30-35 mm. It is also advantageous if the recess of the sampling spoon is ergonomically shaped. The recess also has a curvature that contributes to the ergonomic shape. In particular, the curvature is designed in such a way that the cosmetic product can be removed easily and comfortably and, in particular, the last portion can be removed almost completely, easily and comfortably from the recess with a finger.

In the case of a larger filling volume, the recess of the sampling spoon has a depth of up to 15 mm, particularly preferred 12-14 mm. The recess of the sampling spoon also has a width of up to 22 mm, preferably 19-21 mm. With a larger filling volume, the length of the recess of the sampling spoon is advantageously up to 62 mm, particularly preferred 59-61 mm.

In a preferred embodiment of the device according to the invention, the base portion and the handle together form a cavity that is at least partially accessible from the outside. In particular, the cavity is cylindrical. This has the advantage that information material, such as a package leaflet, instructions for use or advertising material, can be inserted into this cavity from the outside. For example, various information about the filled cosmetic product can be attached directly to the device for the user. In this way, current legal requirements for documentation and labeling can be met.

In a further embodiment, there is a lid in the hollow body which is designed to complement the U-shaped edge of the sampling spoon, for example in the form of a U-shaped plate. A ring or half-ring is provided on this lid opposite its rounded end, which is firmly connected to the lid and which is rotatably mounted in a notch on the inner wall of the hollow body. The lid is applied to the U-shaped edge of the sampling spoon in a sealing manner when the hollow body and sampling spoon are connected. This has the advantage that the cosmetic product in the cavity is additionally protected by a lid.

In another advantageous embodiment, the hollow body of the device has a bottom located opposite the opening, the opening and the bottom are circular and the diameter of the opening is in the range of 90-110% of the diameter of the bottom. The dimensions, with a diameter of the opening that differs by only 10% from the diameter of the base, give the device an aesthetic appearance. In particular, the device can stand on its own on a flat surface when connected, and the sampling spoon and the hollow body can also stand separately. This makes handling easier. The bottom and the opening can also have the shape of a polygon, with the corners lying on a circular circumference with a corresponding diameter.

Preferably, the device according to the invention is manufactured from 100% recycled plastics, in particular post-consumer recyclate (PCR). Mixtures with different proportions of recycled plastics can also be used for production, but pure recyclate is preferred. Furthermore, regardless of the proportion of recyclate, different polymer compositions are suitable for manufacturing the device, for example polyethylene (PE), polypropylene (PP), polystyrene (PS) or polyethylene terephthalate (PET). Mixtures of different polymer compositions can be used, but single-origin plastics are preferred. The device can be recycled without great effort, especially if it is manufactured from single-origin plastics. The material is preferably approved as primary packaging for foodstuffs. It does not interact with the filled product sample so that neither the properties, appearance and surface of the device nor the properties, texture or odor of the filled product sample change when used properly. Proper use here relates in particular to a temperature range of approx. 5° C. to approx. 25° C., in which both the plastic of the device and the cosmetic product sample do not undergo any quality-reducing changes.

In addition, the device can be refilled with a cosmetic product immediately after removal of the cosmetic product and respective cleaning.

This has the particular advantage that the device is environmentally friendly and sustainable. It can be made partly or completely from recycled material and is also completely recyclable or reusable. It can therefore participate in the recycling cycle in various ways. This reduces the $CO_2$ footprint compared to conventional devices for cosmetic products.

Due to the size of the device, recycling also makes ecological sense. In particular, the preferred dimensions of the sampling spoon and the hollow body have the advantage that they can be recognized in standard recycling processes, sorted out and, after sorting out, processed and returned to the material cycle.

The device according to the invention can also have an identifier. This identifier enables the device to be uniquely identified. For example, it can be a barcode or a QR code. The identifier can be applied both to the sampling spoon, for example on the handle, and to the hollow body. A preferred location is, for example, in the area of the outer surface of the handle. The identifier can also be applied in the area of the opening of the hollow body or in the area of the bottom of the hollow body opposite the opening. It is also conceivable that the outer wall of the hollow body has a flattened area on or in which the identifier can be attached. It is particularly advantageous if an identifier is already applied to or in each device during manufacture. Preferably, the identifier is made of the same material as the device itself, for example lasered or printed into the material as an engraving. However, an identifier can also be applied to the device or attached to the device shortly before a cosmetic product is filled. This identifier can already be available at the POS or it can be generated at the POS. For example, labels with an identifier can already be available or printed at the filling location and then attached to the bottom, in the area of the opening or at another location on the outer wall of the hollow body or the handle of the sampling spoon. Furthermore, the device itself can also be printed, engraved or otherwise marked with the identifier.

The device can be uniquely identified and recognized using the identifier. The aforementioned recyclability can also be facilitated via the identifier, as information on the material and recycling of the device can also be stored via the identifier.

In particular, it is also an object of the present invention to provide a method for identifying and hygienically filling a cosmetic product from a particular batch for a user into a device according to the invention. The method according to the invention comprises at least the following steps:

(1) Installing an application software on a mobile device of the user, (2) Opening the application software, (3) Recording the information of the identifier of a device according to claim 12, recording certain information on the cosmetic product filled or to be filled, namely at least the batch designation, the name of the responsible person, the address of the responsible person, the name of the cosmetic product, the intended use and the shelf life, (4) digital linking of the recorded information, (5) Filling a predetermined amount of the cosmetic product into the device.

The batch of the cosmetic product is always specified and describes the manufacturing cycle from which the product in question originates. Each batch is given its own batch designation.

For example, the application software is installed by a digital distribution platform with a simple command, e.g. by tapping an icon, on the user's mobile device, a smartphone or tablet. This step can be carried out in advance, for example in the user's private area. However, it can also be done at the POS. The application software is opened on the mobile device so that the information can then be recorded.

The identifier of the device is applied as described, for example during the manufacture of the device or directly on site. In particular, it contains the information for recognizing the device.

The information on the cosmetic product filled or to be filled includes at least the batch designation, the name of the responsible person, the address of the responsible person, the name of the cosmetic product, the intended use and the shelf life. However, further information can also be recorded, such as the EAN code, the ingredients, the nominal content, the warnings, the place of filling, the date of filling of the cosmetic product.

The name of the responsible person is the name or company name of the manufacturer or the person who places the product on the market or the importer.

Several identical products can have identical information, for example the name of the cosmetic product or product name, the EAN code, the ingredients, the name and the address of the responsible person, the intended use, the nominal content, the warnings, the color and type code. The color code or color number is the distinguishing feature of products with the same name but different shades for lipsticks, blushes, etc. The type code describes the concentration of raw materials, e.g. in the alcoholic phase of perfume, eau de perfume or eau de toilette or also in the formulation of a cream in the "light" or "rich" versions.

This information can, for example, be stored on standard packaging via an identifier, which can then be retrieved and recorded. Many cosmetic products already have an identifier on the standard packaging. This is preferably a barcode or a QR code. Even if the cosmetic product is filled from a tester that does not have an identifier, the identical information can be recorded from another commercially available packaging of the same product.

Some information, such as batch designation, expiration date or filling date, nominal content, can be different for the same product in each package and on each tester. These are therefore recorded by the package from which the product is filled.

The information is recorded in any order by the application software. For example, the information is recorded by reading, typing, scanning or photographing. Preferably, the information is recorded by scanning or reading in the corresponding identifiers. Furthermore, information that is not stored by an identifier can be recorded by typing or photographing. Corresponding information, for example the batch designation of the filled or to-be-filled product, can be typed into a corresponding field and recorded by the application software. In another case, the corresponding information can be recorded by photographing the imprint on the respective package. The information can be recorded by the supplier or by the user himself, e.g. if the POS is a drugstore without staff on hand to advise customers.

At least the information of the identifier of the device and the legally prescribed information on the cosmetic product are recorded. However, further information can also be recorded.

It is therefore advantageous if additional information about the time and place of filling is recorded. This can be done automatically by the application software when the information is recorded.

It is also possible to record information on the identity of the supplier. This can, for example, be typed in or carried out by reading or scanning a corresponding identifier. For this purpose, the supplier creates an identifier that contains information on the name and address of the POS, possibly on individual persons such as employees, and the information of this identifier is recorded.

The recorded information is digitally linked in the application software. At least the information of the identifier of the device and the recorded information on the cosmetic product filled or to be filled are linked. Also, all further recorded information can be digitally linked.

In addition, product-related information, e.g. application information, new releases, advertising material, can be linked in the application software with the recorded information on the cosmetic product filled or to be filled.

The supplier himself does not have to provide or use the application software on an own device, he only has to ensure that the user has installed the application software and the supplier or the user must record the information described.

The cosmetic product is filled into the device. This step can take place at any time before or after the other steps. It must be ensured that no mix-up can occur.

For this purpose, a quantity, for example approx. 3 ml, is filled into the device from a tester or commercially available packaging depending on the dimensions of the recess of the sampling spoon. For this purpose, sampling spoon and hollow body are used. The product is removed from a jar using the head portion of the spoon. Creamy textures from tubes or pump bottles are poured directly into the spoon. Liquid textures from pump bottles or other containers or loose powders are dispensed into the recess of the sampling spoon or directly into the hollow body. Solid textures (compressed powders, lipstick or other sticks) are removed using the U-shaped edge of the spoon and filled in this way. Textures on applicators, such as lip gloss, can be scraped off with the edges of the spoon.

The filling is hygienic as it can be carried out without touching the texture and without touching the recess of the sampling spoon or the interior of the hollow body. The sampling spoon is then inserted into the hollow body and connected to it. The tightly sealed and transport-safe device is handed over to the user for use at home.

The application software can also perform various additional functions. For example, it is possible to document the filled cosmetic product and assign it to the exact device into which it is filled. The information can be clearly arranged and all current legal requirements for documentation and labeling can be met. In the case of several cosmetic products filled for one user, correct differentiation and unique assignment to the device containing the cosmetic product is possible due to the identifier of the respective device. Furthermore, it is also possible to differentiate between several fillings of the same cosmetic product in different devices.

Further product-related information can be stored in the application software for the user to access, such as help and support for the product being filled in the form of general application videos, for removing the cosmetic product and for applying various textures from the recess of the sampling spoon. The user can document the fillings that have been made for them by showing the application software on their mobile device. Based on their filling history, they can be granted targeted discounts or given further recommendations.

The application software can also be used to obtain product-related information, recommendations and promotion for further cosmetic products tailored to the filled product.

Via the application software, the user can also be forwarded to the sale of the filled cosmetic product or a cosmetic product suggested by the application software in a commercially available quantity and packaging. This can be the supplier where the cosmetic product has been digitally linked to the device in the application software and the device has been filled with the cosmetic product. The application software can also refer the user to online offers or other retailer stores.

The application software can also offer the option for the user to document their experience with the respective cosmetic product, for example via a predefined questionnaire, via individual experience reports or via photos that also show the condition before and after use.

It is particularly advantageous that any cosmetic products can be filled into the device using this method. The method makes the dispensing of product samples very flexible. Suppliers and users can fill any product sample at any time and the user can test it at home. This eliminates the need to produce product samples in small tubes, mini bottles, sachets or similar. It is also no longer necessary to keep product samples of different products in stock at the POS, as everything can be filled into a device according to the invention at any time. This method has the additional advantage that waste is avoided, as the device is recyclable, whereas the previously known packaging for product samples is generally not.

Furthermore, the method according to the invention and the device according to the invention can also be used for samples from other areas, for example for food samples, food supplement samples, animal feed samples, individual wall paints and much more.

In particular, the method according to the invention can include further steps in which a profile of the user is created and information about this profile is recorded. These steps can be carried out at any point after step (2). For example, a profile can be created by the user at home before they visit the POS. Individual user data can be stored in this profile. The information of a user name and a corresponding e-mail address must be stored. This allows the user to be clearly identified. Furthermore, the user's name, address, gender and age, as well as skin type, skin condition, hair color, hair texture and eye color, any intolerances to certain ingredients, preferences for certain brands or manufacturers and other cosmetics-related data can be stored in the profile. Furthermore, various devices can be created, archived and managed in the user's profile with the cosmetic products filled in them.

By digitally linking the recorded information on the device and the filled cosmetic product and, if applicable, the profile, the user can also receive product-related information, recommendations and promotions for cosmetic products that are individually tailored to them in the application software. This applies both to cosmetic products that have already been filled into a device for the user and to other cosmetic products that could be of interest to the user in connection with the recorded information.

In the individual user profile, various additional functions can be provided for the user. For example:

various product information, for example as a package leaflet, information video or via branded content, can be called up, personalized discounts can be displayed, a notepad function can be displayed, in which further cosmetic products intended for testing are suggested, for example by displaying notes, saving links, photos, screenshots from other channels such as Instagram, lifestyle magazines, YouTube, a rating function is used, in which I. a personal rating, for example a star rating after using the cosmetic product, a link to other products, an indication of a previously used product replaced by the test, or II. an evaluation for sharing via the application software with other users who have also created profiles or externally, where various information, before/after photos, application videos with tips and tricks, inspirations and other notes are possible, a delivery can be triggered via a buy-it-now function field or via delivery services, a recommendation function can be displayed with recommended products with purchase options or with suggestions for new, supplementary or complementary products on the basis of products tested, evaluated or listed by the user, individual design options of the application software can be used, a detailed, individual profile can be created.

Furthermore, an online/offline link can be provided in which the notepad function is automatically activated in the application software when a branch or retailer store is entered and the notepad is displayed.

In a preferred embodiment of the method according to the invention, at least one of the recorded information can be accessed by the user in the application software and the digitally linked information on the device and the cosmetic product filled therein can be retrieved or displayed to the user.

In a further preferred embodiment of the method according to the invention, the application software stores the recorded information and also its digital link in a cloud. At least the information on one or more filled devices and the information on the filled cosmetic product(s) are stored. In addition, information on the time and place of filling and on the person of the supplier, on the mobile devices on which the application software is installed and, if applicable, the information of the associated user profiles can be stored. Other information, for example product-related, can also be stored in the cloud and linked to the recorded information.

The information in the cloud can now be accessed by the user, the supplier or an authorized third party.

By accessing at least one of the recorded information in the cloud, the user, the supplier or an authorized third party can retrieve or display the digitally linked information from the cloud.

By retrieving information from the cloud, the information on the devices, the cosmetic products and the user profiles can now be evaluated for various purposes. For example, the supplier, any other retailer or a manufacturer of cosmetic products can select a specific group of user profiles or a specific group of devices filled with the corresponding cosmetic products and use them for evaluations or campaigns. For the B2C sector, for example, push campaigns can be started with a notification to the user at a specific time after the corresponding cosmetic product has been filled. Furthermore, the user can be recommended additional products that match those in the device linked to their profile. Here, products are conceivable that can be used as an alternative or as a supplement, in particular with regard to the intended use, the type of application, the effect on the complexion, etc.

The information stored in the cloud can be used for anonymized evaluations, consultations and general monitoring in the B2B sector.

It is also possible to use the data from the cloud as part of business intelligence, for example for crediting or evaluating sales for the filling supplier or for evaluating the filling carried out depending on various criteria, such as national application, regional application, filling by product group or brand.

It is also possible to identify customer card holders and integrate data on filled cosmetic products in a user profile to complete the user's approach and build and improve customer loyalty.

The cloud also enables communication with or the creation of interfaces to other systems, such as the CRM system of a supplier or another retailer. Use cases are, for example, the granting of a discount when purchasing a cosmetic product. Discounts can be individually configured by the retailer or supplier. Moreover, it is possible to identify and/or integrate information from other customer card profiles, which some suppliers and retailers already have, via communication or the creation of interfaces. It is also possible to attribute the sales of the respective cosmetic product to the supplier who has filled the product into the device using the method according to the invention.

The cloud can also serve as the basis for white label solutions, for example as the basis for creating a customer app that is personalized to a supplier or another retailer.

Advantageously, the method according to the invention and the device according to the invention make it possible for the supplier and/or the user to decide for themselves which cosmetic product can be taken and tested as a product sample. Previously, it was only possible for pre-packaged product samples selected by the retailer to be provided. With the method and the device according to the invention, it is now possible to advise the user individually and to fill cosmetic products for him. The product is tested independently of the point of service (POS). This is advantageous if a user does not want to test at the POS, such as in cosmetics retail stores, or cannot test on site, such as in online retail.

With the aid of the following figures, a device and a method according to the invention will be explained in more detail, without restricting the invention to the specific embodiments shown here.

It shows:

FIG. 1 a longitudinal section through an sampling spoon

FIG. 2 Perspective view of an sampling spoon

Figure 3:
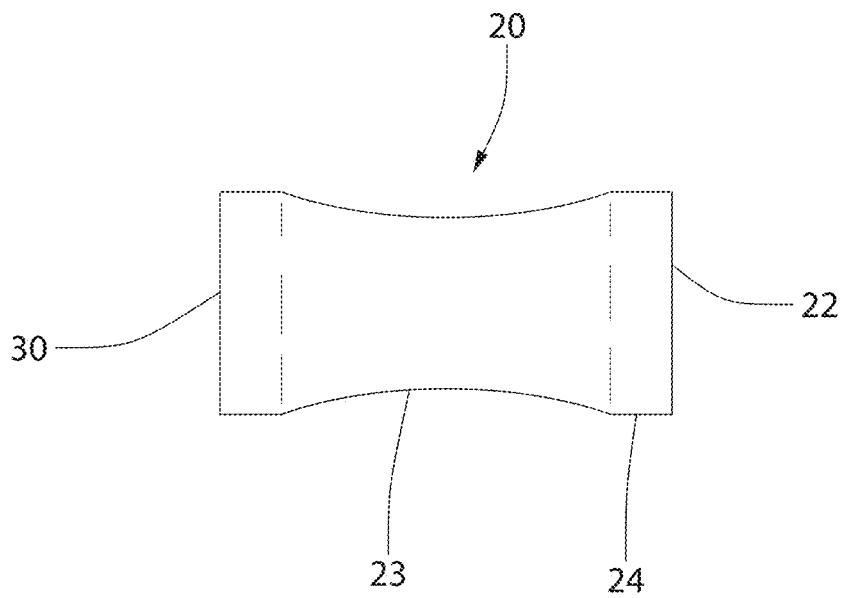

FIG. 3 Side view of a hollow body

Figure 3A:
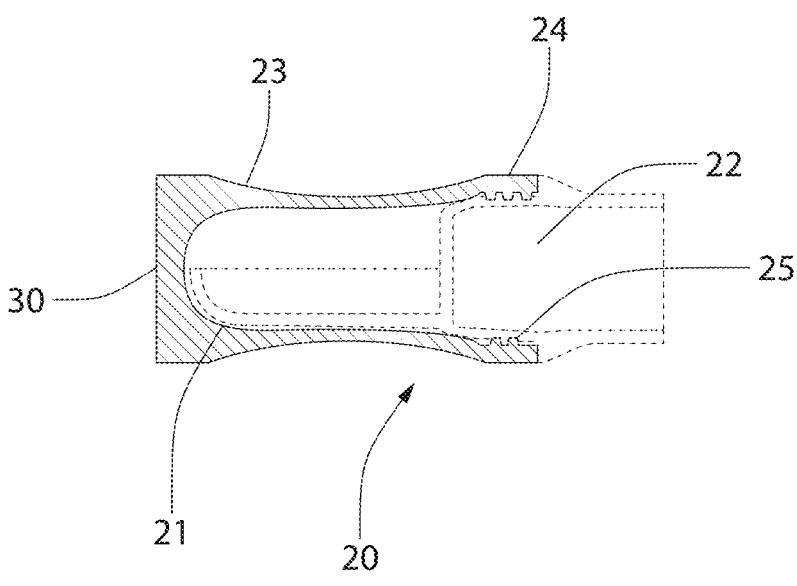

FIG. 3a longitudinal section of a hollow body

Figure 4:
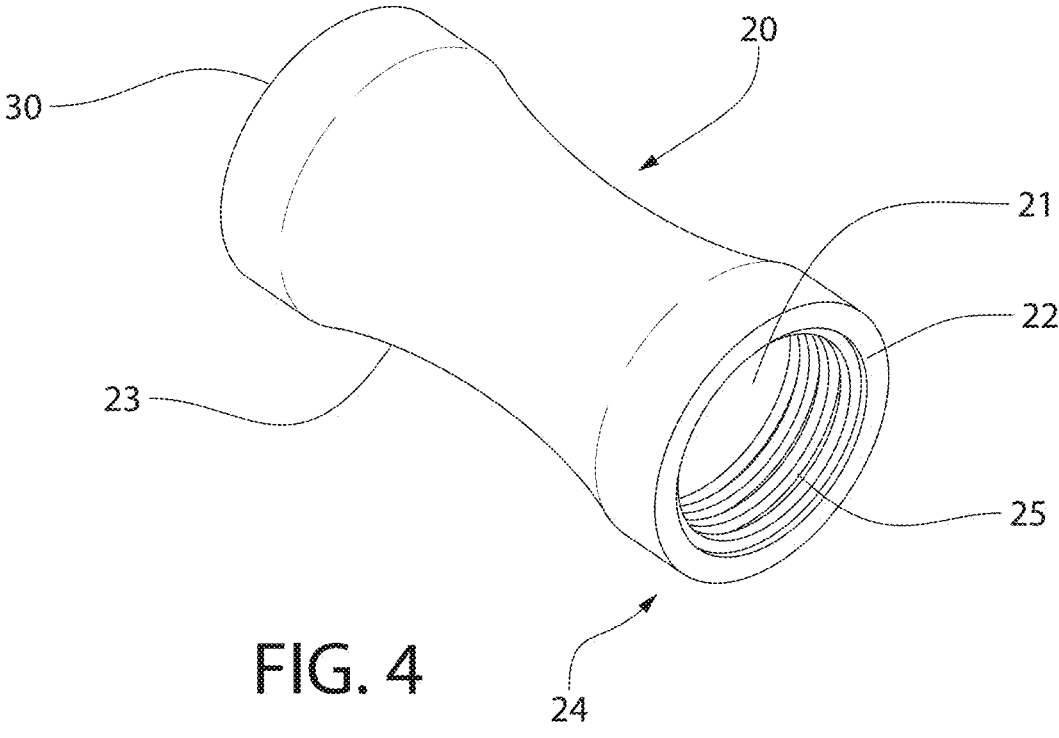

FIG. 4 Perspective view of a hollow body

Figure 5:
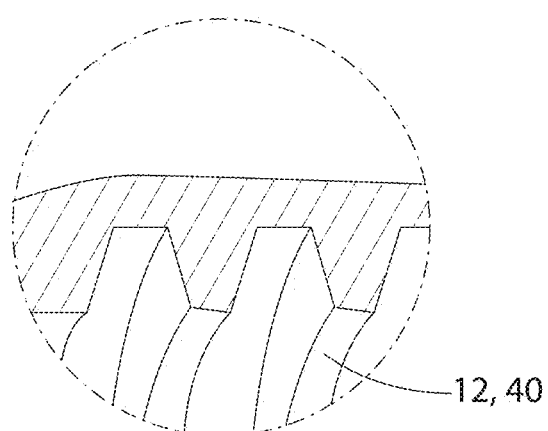

FIG. 5 a detailed view of a trapezoidal thread

Figure 6:
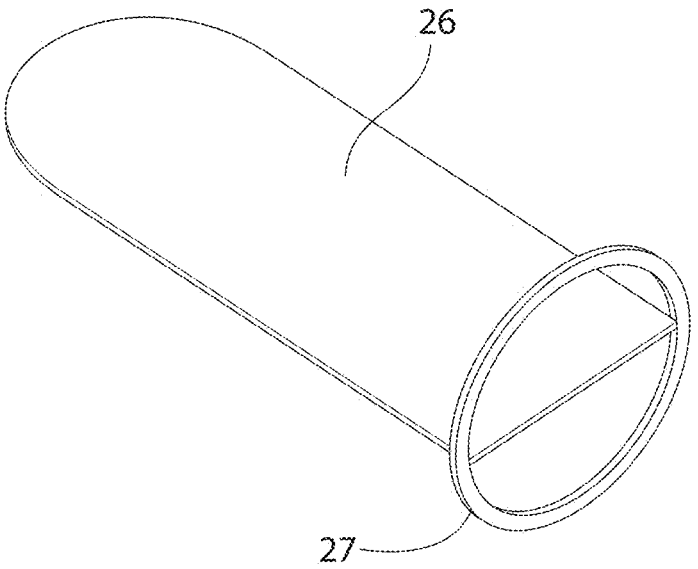

FIG. 6 Perspective view of a lid

Figure 7:
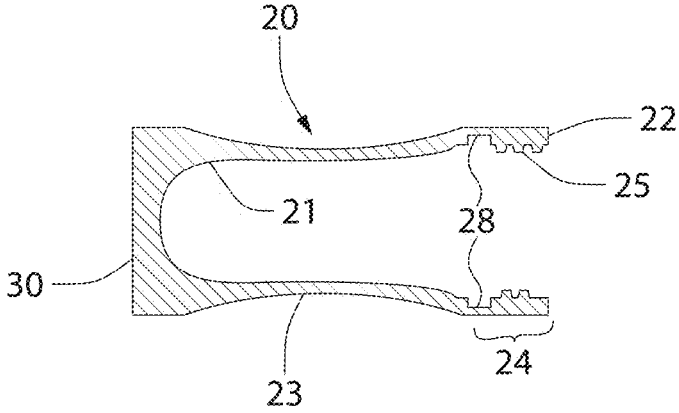
Figure 8:
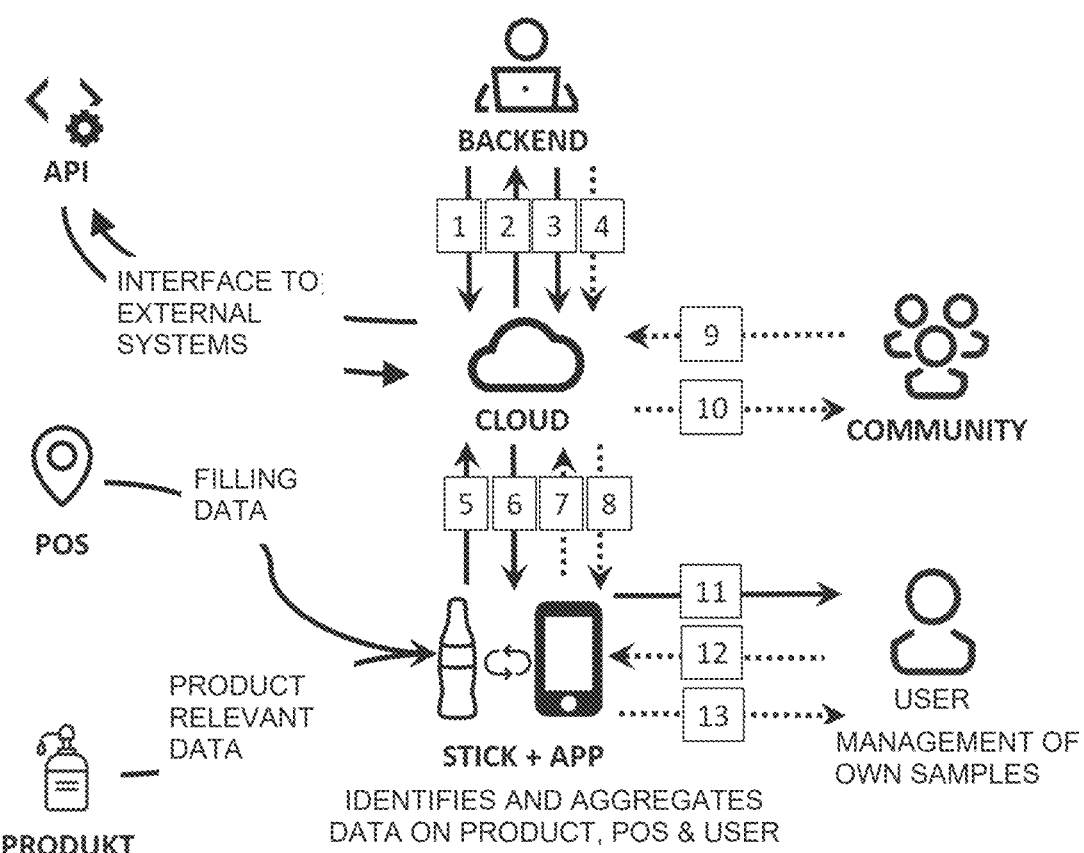

FIG. 7 a longitudinal section of a hollow body with notch for receiving the lid FIG. 8 a schematic illustration of the method according to the invention

REFERENCE NUMBERS IN THE FIGURES

10 Sampling spoon
11 Head portion

12 External thread
13 Handle
14 Base portion
15 Connecting portion
16 U-shaped edge
17 Recess
18 Sealing portion
19 Cavity
20 Hollow body
21 Inner wall
22 Opening
23 Outer wall
24 Connecting portion
25 Internal thread
26 Lid
27 Ring or half ring
28 Notch
30 Bottom
40 Trapezoidal thread
50 Cosmetic product FIG. 1 shows a sampling spoon (10) in longitudinal section. The head portion (11) has a recess (17) in which the cosmetic product (50) is located after it has been filled. At the distal end, the recess ends in the U-shaped edge (16); at the proximal end, the head portion (11) of the sampling spoon (10) is connected to the base portion (14). The base portion (14) has a beveled area that forms a sealing portion (18). The sealing portion (18) is pressed along its circumference against the inner wall (21) of the hollow body (20) when the sampling spoon (10) and hollow body (20) are connected. The sealing portion (18) prevents a filled cosmetic product (50) from contaminating the inner and outer threads (25, 12) if it does not remain in the recess (17) during transport and storage. The handle (13) directly adjoins the base portion (14) and serves to ensure that the sampling spoon (10) can be gripped in this area by the user and supplier. An external thread (12) is provided as the connecting portion (15) on the sampling spoon (10) shown in FIG. 1. The base portion (14) and the handle (13) are designed in FIG. 1 in such a way that together they form a cavity (19). After filling a cosmetic product, for example, the information associated with this product can be inserted into this cavity (19) in the form of an package leaflet.

FIG. 2 shows a perspective view of the embodiment shown in FIG. 1.

FIG. 3 shows a side view of a hollow body (20). There is a bottom (30) on one side and an opening (22) on the other side. In the form shown, the hollow body (20) has a hyperboloid outer wall (23), with a cylindrical area adjoining the hyperboloid area at both ends. This gives the hollow body (20) a flattering design. The bottom (30) can be used as a standing surface.

FIG. 3a shows a longitudinal section through a hollow body (20). In the area of the opening (22), the connecting portion (24) with an internal thread (25) is arranged on the inner wall (21). The bottom (30) is located opposite the side of the opening (22). The outer wall (23) is cylindrical in the area of the bottom and in the connecting portion (24), and hyperboloid in the area between the bottom (30) and the connecting portion (24). The inner wall (21) is also hyperboloid in shape.

FIG. 4 shows a perspective view of the hollow body. There is an internal thread (25) on the inner wall (21) in the area of the opening (22). By inserting the sampling spoon (10) into the opening (22) of the hollow body (20), connecting and screwing the internal thread (25) to the external thread (12), a fixed and detachable connection of the two parts of the device can be created. This connection is tight so that the filled cosmetic product remains in the device and the threaded areas (12, 25) are not contaminated.

FIG. 5 shows an enlarged section of a trapezoidal thread. The flank angle is 30°.

FIG. 6 and FIG. 7 show a lid (26) and a hollow body (20) of a device according to the invention with a lid (26). The lid (26) consists of a U-shaped plate, the circumference of which simulates the U-shaped edge (16). A ring (27) is attached to the straight end perpendicular to the plane of the lid. When mounted, this ring (27) runs in the notch (28) on the inner wall (21) of the sampling spoon (20). It is rotatably mounted and can rest on the recess (17) of the sampling spoon (10) during the screwing of the sampling spoon (10) and hollow body (20). This closes it tightly.

In the following, a preferred embodiment of the method according to the invention is described in connection with FIG. 8. FIG. 8 shows a diagram of the interaction in this method between user, supplier (POS), cosmetic product, device and application software (stick and app), cloud, an authorized third party (backend) and other systems involved (API, community).

This initially involves processes that are not shown. A consultation takes place between the supplier and user, for example on the subject of skin and body care, the selection and application of make-up or the recommendation of fragrances. This consultation is not depicted; it results from the interaction between the supplier and the user.

Subsequently or in the course of this conversation, those cosmetic products (product) that come into question and are to be tested are filled into the device (stick) according to the invention by the supplier or by the user himself for the user to try at home. This requires the relevant cosmetic product in the corresponding tester (product) and a device (stick). FIG. 8 shows a cosmetic product. The user requires the application software (app) on a mobile device, in this case a smartphone or tablet.

Not shown is the filling process, where in this example the supplier shows the user the product that he is going to fill. He states the name, manufacturer or responsible person and intended use and draws attention to the ingredients according to the INCI designations. The supplier fills a quantity of approx. 3 ml from the tester into the stick.

The supplier works hygienically without touching the texture. The tightly sealed and transport-safe stick is given to the user for use at home.

The stick in the example already has a lasered barcode on the production side.

The stick is "digital" in the sense that the identifier embedded in the material acts as a "key" for full use of the functions offered by the application software. The stick can be uniquely identified with the help of the identifier information.

The user installs and opens the application software (app) on a mobile device as part of the filling process. The user is then guided through a checklist that can be used to record all the necessary information. This primarily involves recording the identifier of the device, the information on the cosmetic product and the batch number of the tester. The information on the cosmetic product is recorded by scanning the barcode of a corresponding original product that corresponds to the product in the tester. This barcode contains the EAN, the name of the product, the name and address of the person responsible, the ingredients according to the INCI designations. The corresponding intended use is defined by ticking the boxes for lips, eyes, face, body and hands. The filling date is automatically recorded in the application software and is also used to calculate the minimum shelf life. The place of filling is also recorded automatically.

After completing the entry, the user receives the filled product sample.

At home, the user uses the app to identify the code of the stick and receives information about the product filled in it. The user tests the product by opening the stick and removing the filled texture. This is done either by removing it from the recess of the spoon or from the hollow body with the fingers or with the aid of cosmetic aids (cotton pad, Q-tip, brush, applicator, etc.). Due to its shape, the stick can be completely emptied with the fingers. No residue remains in the recess of the sampling spoon or hollow body.

The invention claimed is:

1. A device for hygienic filling, transport and storage of a cosmetic product, comprising:
   a sampling spoon having a head portion having a U-shaped edge and a recess for receiving the cosmetic product and a handle,
   a hollow body having an outer wall, an inner wall and an opening through which the sampling spoon can be inserted into the hollow body,
   wherein the hollow body and the sampling spoon can be detachably connected to each other,
   wherein the inner wall of the hollow body and the U-shaped edge of the head portion of the sampling spoon are designed in such a way that, when the hollow body and the sampling spoon are in the connected state, the U-shaped edge of the sampling spoon lies against the inner wall of the hollow body.

2. The device according to claim 1, wherein the inner wall of the hollow body and the recess of the head portion of the sampling spoon are designed in such a way that, in the connected state, the outside of the head portion of the sampling spoon lies against the inner wall of the hollow body.

3. The device according to claim 1,
   wherein the sampling spoon has a base portion which is arranged between the head portion and the handle and which has a connecting portion facing the handle and a sealing portion facing the head portion, and the hollow body has a further connecting portion arranged on the inner wall in the area of the opening,
   wherein the connecting portions are designed in such a way that the detachable connection is made by connecting these connecting portions to one another and the sealing portion of the sampling spoon is pressed against the inner wall of the hollow body in a sealing manner in the connected state.

4. The device according to claim 3, wherein the connecting portion of the sampling spoon has an external thread and the connecting portion of the hollow body has an internal thread.

5. The device according to claim 4, wherein the internal thread and the external thread are designed as a trapezoidal thread with a flank angle of 30° and engage tightly in the connected state.

6. The device according to claim 4, wherein the internal thread and the external thread are designed as a trapezoidal thread with a flank angle of at least 28° and at most 32° and engage tightly in the connected state.

7. The device according to claim 1, wherein the outer wall of the hollow body is designed to be one or more of hyperboloid, cylindrical and tapered.

8. The device according to claim 1, wherein the recess of the head portion of the sampling spoon has a filling volume of 1-4 ml.

9. The device according to claim 1, wherein the recess of the sampling spoon is ergonomically shaped and has a depth of 3-10 mm, a width of 12-17 mm and a length of 25-40 mm.

10. The device according to claim 1, wherein the base portion and the handle together form a cavity which is at least partially accessible from the outside.

11. The device according to claim 1, wherein a lid complementary to the U-shaped edge of the sampling spoon is provided in the hollow body with a ring or half-ring which is rotatably mounted in a notch on the inner wall of the hollow body and can be fitted in a sealing manner on the U-shaped edge of the sampling spoon by connecting the hollow body and the sampling spoon.

12. The device according to claim 1, wherein the hollow body has a bottom arranged opposite the opening, the opening and the bottom are circular and the diameter of the opening is in the range from 90 to 110% of the diameter of the bottom.

13. The device according claim 1, wherein the device comprises an identifier.

14. The device according to claim 1, wherein the recess comprises a depression defined by a closed surface.

15. The device according to claim 1, wherein the recess comprises a depression defined by a bottom surface without a hole defined therein.

16. A method for the identification and hygienic filling of a cosmetic product of a specific batch for a user, comprising the following steps:

installing an application software on a mobile device of the user, opening the application software, recording the identifier of a device according to claim 13, recording information regarding the cosmetic product filled in the device or the cosmetic product to be filled in the device, namely at least a batch designation of the cosmetic product, the name of a responsible person, the address of the responsible person, the name of the cosmetic product, the intended use of the cosmetic product and the shelf life of the cosmetic product, digitally linking the identifier and the recorded information regarding the cosmetic product, and filling a predetermined amount of the cosmetic product into the device.

17. The method according to claim 16, further comprising the step of creating a profile of the user and recording the information relating to this profile.

18. The method according to claim 16, wherein in the application software, by accessing the identifier and/or at least one of the recorded information regarding the cosmetic product, the user retrieves or is shown the identifier and the digitally linked information regarding the cosmetic product.

19. The method according to claim 16, wherein the application software stores the identifier, the recorded information regarding the cosmetic product, and the digital link therebetween in a cloud such that the digitally linked identifier and the recorded information regarding the cosmetic product can be retrieved or displayed from the cloud by accessing the identifier and/or at least one of the recorded information regarding the cosmetic product.

20. A method for the hygienic filling of a cosmetic product of a specific batch in a device according to claim 13 for a user using application software on a mobile device, the method comprising:

recording the identifier of the device, recording information regarding the cosmetic product, the recorded information comprising at least the name of the cosmetic product, a batch designation of the cosmetic product, the shelf life of the cosmetic product, and the manufacturer of the cosmetic product, digitally linking the identifier and the recorded information regarding the cosmetic product, and filling a predetermined amount of the cosmetic product into the device.

\* \* \* \* \*